(12) United States Patent
Athans et al.

(10) Patent No.: US 6,773,023 B2
(45) Date of Patent: Aug. 10, 2004

(54) SELF-LUBRICATING TRAILER BEARING PLATE FOR FIFTH WHEEL

(75) Inventors: George C. Athans, Lake In The Hills, IL (US); Leonidas C. Athans, Crystal Lake, IL (US)

(73) Assignee: Direct Dimension Inc., Lake In The Hills, IL (US)

( * ) Notice: Subject to any disclaimer, the term of this patent is extended or adjusted under 35 U.S.C. 154(b) by 0 days.

(21) Appl. No.: 10/273,342

(22) Filed: Oct. 17, 2002

(65) Prior Publication Data

US 2003/0034630 A1 Feb. 20, 2003

Related U.S. Application Data

(60) Division of application No. 09/873,734, filed on Jun. 4, 2001, now abandoned, which is a continuation-in-part of application No. 09/258,761, filed on Feb. 26, 1999, now abandoned, which is a continuation-in-part of application No. 09/360,552, filed on Jul. 26, 1999, now Pat. No. 6,322,093.

(51) Int. Cl.[7] .............................................. B62D 53/66
(52) U.S. Cl. ...................................... 280/433; 280/504
(58) Field of Search .............................. 280/433, 438.1, 280/441.1, 439–441, 504; 384/420–421, 125, 297, 907–909

(56) References Cited

U.S. PATENT DOCUMENTS

| 481,655 A | 8/1892 | Olsen |
|---|---|---|
| 2,503,530 A | 4/1950 | Weber |
| 2,508,610 A | 5/1950 | Kendall |
| 2,662,799 A | 12/1953 | Schaefer |
| 2,665,177 A | 1/1954 | Schaefer |
| 2,958,541 A | 11/1960 | Bar |
| 3,091,501 A | 5/1963 | Satrum |
| 3,174,812 A | 3/1965 | Widmer |
| 3,218,989 A | 11/1965 | Kreiner et al. |
| 3,275,390 A | 9/1966 | Franks |
| 3,337,277 A | 8/1967 | Arnold |
| 3,511,523 A | 5/1970 | Fuller |
| 3,622,173 A | * 11/1971 | Hodgson .................... 280/433 |
| 3,704,924 A | 12/1972 | Lowry |
| 3,801,136 A | 4/1974 | Cunha |
| 3,887,251 A | 6/1975 | McKay |
| 3,924,909 A | 12/1975 | Kent et al. |
| 4,121,853 A | 10/1978 | McKay |
| 4,169,635 A | 10/1979 | Szalay et al. |

(List continued on next page.)

FOREIGN PATENT DOCUMENTS

| DE | 1037871 | 8/1958 |
|---|---|---|
| DE | 29 34 748 | 3/1980 |
| DE | 3833910 A | 4/1989 |

OTHER PUBLICATIONS

Advertising brochure of Canada Polymeric Inc. for POLYGLIDE Fifth Wheel Plate.
Advertising brochure for Holland's 3500 LowLube Fifth Wheels.
Advertising brochure for REVOLVER Greaseless Coupling System.
Advertising brochure of American Made, Inc. for the 5th Wheel Interface Lubricant.

Primary Examiner—Lesley D. Morris
Assistant Examiner—Matt Luby
(74) Attorney, Agent, or Firm—Wallenstein Wagner & Rockey, Ltd.

(57) ABSTRACT

An assembly for coupling a tractor to a trailer is disclosed. The assembly comprises a fifth wheel bearing plate and a trailer bearing plate assembly. The trailer bearing plate assembly includes a self-lubricating plate securely attached to an underside of said trailer by a chemical attachment means.

11 Claims, 4 Drawing Sheets

U.S. PATENT DOCUMENTS

| | | |
|---|---|---|
| 4,457,531 A | 7/1984 | Hunger |
| 4,542,912 A | 9/1985 | St. Louis |
| 4,752,081 A | 6/1988 | Reeners et al. |
| 4,805,926 A | 2/1989 | Mamery |
| 4,841,872 A | 6/1989 | Wicks et al. |
| 4,913,263 A | 4/1990 | Spiers |
| 4,946,184 A | 8/1990 | Larocco |
| 5,066,035 A | 11/1991 | Athans et al. |
| 5,165,714 A | 11/1992 | Kaim |
| 5,263,856 A | 11/1993 | Huehn et al. |
| 5,411,281 A | 5/1995 | Poirier |
| 5,429,383 A | 7/1995 | Reed |
| 5,431,424 A | 7/1995 | Colwell |
| 5,522,613 A | 6/1996 | Heeb |
| 5,620,770 A | 4/1997 | Cork |
| 5,782,444 A | 7/1998 | Anderman et al. |
| 5,802,669 A | 9/1998 | Wurdack |
| 6,045,148 A | 4/2000 | Baumeister et al. |
| 6,322,093 B1 * | 11/2001 | Athans et al. .............. 280/433 |

* cited by examiner

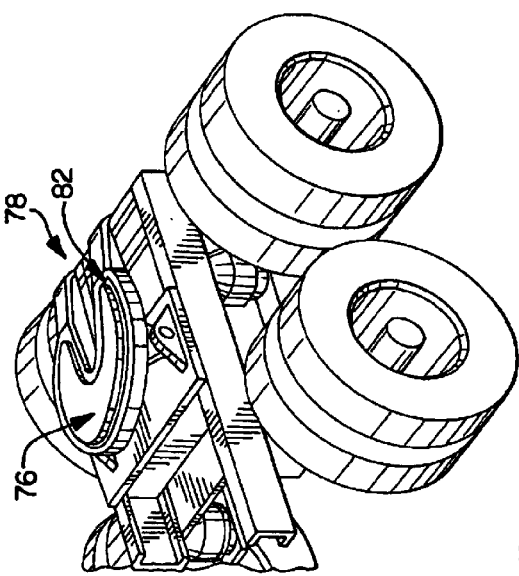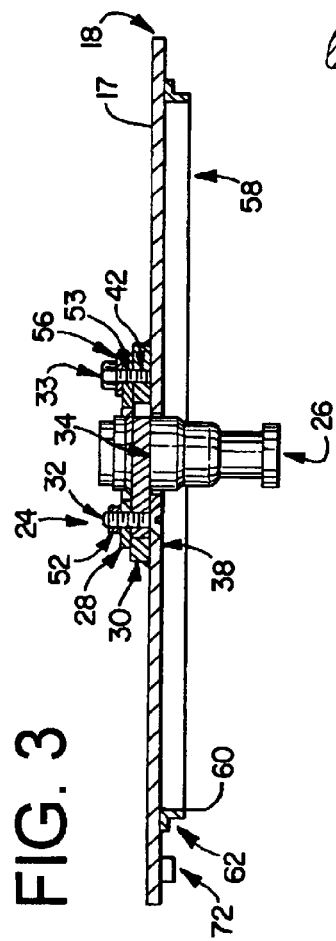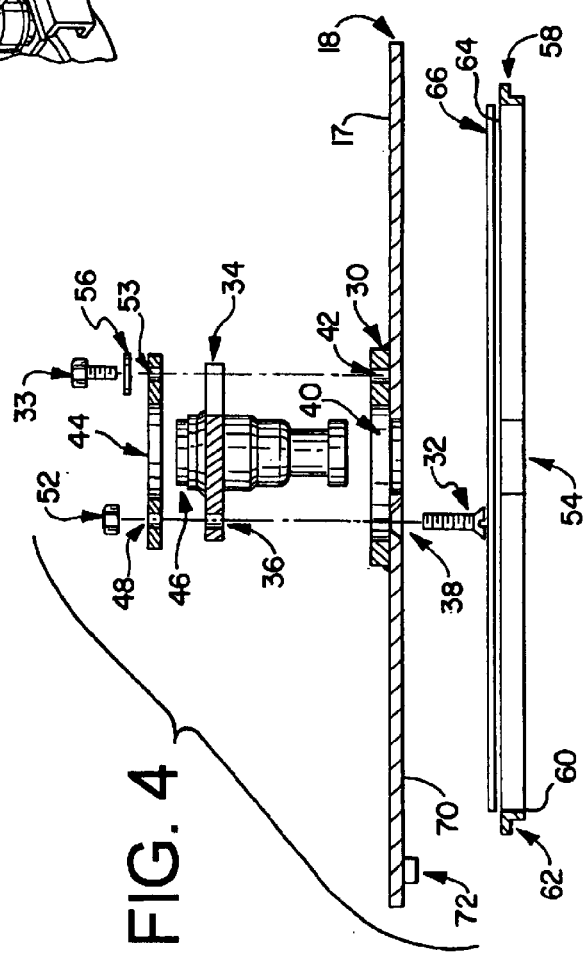

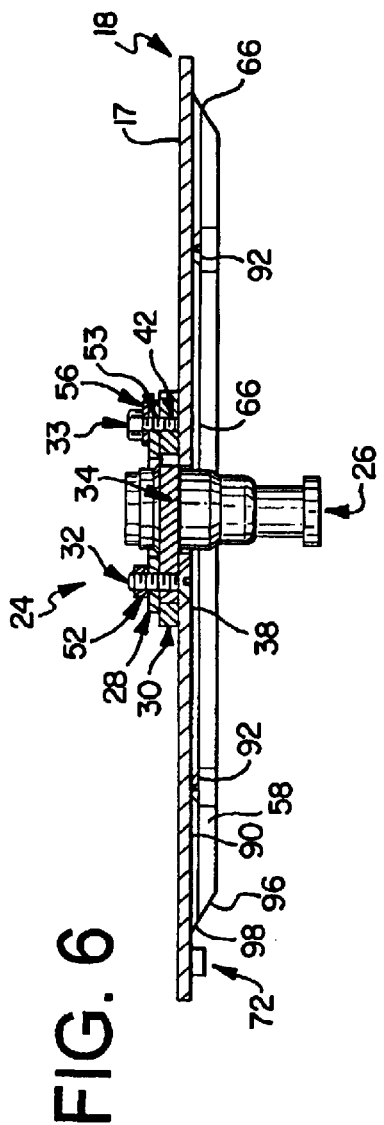
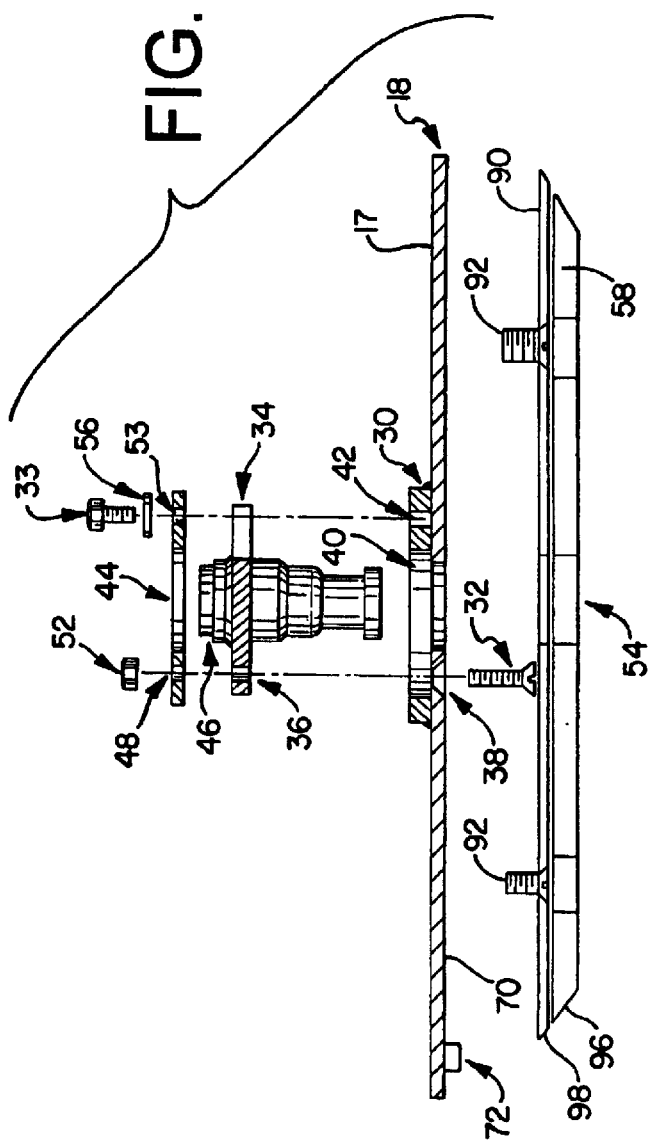

SELF-LUBRICATING TRAILER BEARING PLATE FOR FIFTH WHEEL

RELATED APPLICATIONS

This is a divisional application of U.S. applications Ser. No. 09/873,734 filed Jun. 4, 2001, now abandoned; which was a continuation-in-part application of U.S. application Ser. No. 09/258,761 for "Self-Lubricating Trailer Bearing Plate For Fifth Wheel," filed Feb. 26, 1999 Now abandoned, and U.S. Ser. No. 09/360,552 for "Double Shear Trailer Bearing Plate for Fifth Wheel," filed Jul. 26, 1999 now U.S. Pat. No. 6,322,093.

TECHNICAL FIELD

The present invention relates generally to a fifth wheel/upper coupler assembly for coupling a truck tractor to a semi-trailer, and more particularly to an improved self-lubricating plate for use with a trailer bearing plate and a tractor fifth wheel.

BACKGROUND OF THE INVENTION

Conventionally, truck tractors have been coupled to a semi-trailer by a coupling device commonly referred to as a "fifth wheel". Accordingly, the truck tractor has a "fifth wheel" comprising a substantially round flat plate positioned in a substantially horizontal plane to form a tractor bearing surface. The semi-trailer includes a kingpin extending downwardly to locate and seat with the locking mechanism in the fifth wheel of the tractor. The trailer further includes a trailer bearing surface to match the tractor bearing surface. Once coupled, the tractor and trailer can pivot about the kingpin to permit the truck and trailer to articulate when turning. Because the tractor bearing plate necessarily bears a large portion of the trailer weight, much friction between the two bearing surfaces is developed. This friction adversely affects vehicle handling, increases tire wear, fatigues the driver, impairs safety and causes premature wear and damage to the truck and trailer chassis and their related components.

To reduce this friction, a lubricant such as grease has been placed between the truck tractor and semi-trailer upper coupler assembly. However, it is difficult to maintain a satisfactory layer of grease between the two bearing surfaces, thus requiring the grease to be often replenished. In addition, grease is environmentally unfriendly and very messy, attracts dirt and falls from the tractor to the road surface, thus becoming a hazard to vehicles. Further, as the grease dissipates, the handling and performance characteristics of the truck tractor and semi-trailer deteriorate such that oversteer is experienced creating an unsafe condition. Too often, grease is not utilized as required.

To eliminate the need for a layer of grease, ball and roller bearings have been utilized to permit the tractor bearing surface itself to rotate. However such coupling devices are relatively complex, expensive, heavy, difficult to maintain and commercially unacceptable.

Others have replaced the layer of grease with a substrate having a low coefficient of friction, such as Teflon® or various plastics, secured as a cover to the tractor bearing surface. Commonly owned U.S. Pat. No. 5,066,035 discloses a mechanically mounted, rotatable disk produced from a polymeric material to reduce friction. U.S. Pat. No. 4,121,853 to McKay and U.S. Pat. No. 4,805,926 to Mamery disclose an anti-friction layer that is mechanically fixed to a bearing plate. And, U.S. Pat. No. 4,457,531 to Hünger teaches a mechanically fixed, anti-friction layer attached to a tractor's fifth wheel.

The problems associated with mechanically attached, anti-friction layers include difficulty in retrofitting, peeling or warping by the anti-friction layer, and once the layer experiences some wear the metal devices used to attach the layers come into direct contact with the metal fifth wheel causing a great deal of friction. Furthermore, replacement of the layer is a costly, time consuming procedure.

Additionally, when pulling an empty trailer, the trailer bearing surface tends to bounce on the tractor bearing surface. This vibration is transmitted into the tractor cab, further adding to the fatigue and discomfort of the driver. Likewise, metal fatigue to the truck tractor and semi-trailer increases.

The friction also leads to wear on the kingpin. While other components of the trailer bearing are lubricated, the kingpin experiences wear from the pulling and turning by the tractor. The kingpin is often difficult to replace because it is welded to the bearing surface and typically located in a place which is difficult or impossible to reach.

Furthermore, pulling, turning, and changing directions exert a great deal of force on the trailer bearing. Under the force of the loaded trailer and the tractor, the trailer bearing surface experiences premature wear requiring expensive replacement of the bearing surface.

The present invention is provided to solve the problems stated herein as well as other problems.

SUMMARY OF THE INVENTION

In accordance with the invention, a novel trailer plate assembly for semi-trailers has been developed for a truck tractor fifth wheel. The trailer bearing plate assembly comprises a self-lubricating plate fixedly attached to a housing by a chemical attachment means. The self-lubricating plate includes a perimeter surface terminating with a chamfer. A contact surface of the disk self-lubricating plate has a precision surface finish on the order of about 250 microns. This facilitates the holding of the chemical attachment means on an outer surface of the housing. The self-lubricating plate is preferably formed from an ultra-high molecular weight polyethylene plastic such as Tivar®. A Tivar® disk or rectangular plate having a thickness of the order of 0.125" has been found to work satisfactorily. The self-lubricating plate includes a centrally located hole to permit a kingpin to extend therethrough.

The chemical attachment means is an adhesive backing such as Adhesive FasTape #8345 or Adhesive FasTape #1191UHA (ultra high adhesive) manufactured by Avery Dennison or a liquid adhesive such as Loctite® 401 or Loctite® 4471. The contact surface of the self-lubricating plate is primed with a commercially available primer such as Loctite® 770. The chemical attachment means is then applied to the contact surface of the self-lubricating plate, and the self-lubricating plate is chemically fixed to the outer surface of the housing.

In addition, a front bar is mounted to the outer surface of the housing. The front bar is generally produced from steel rod and is welded directly to the outer surface of the housing. The front bar acts as a barrier between the self-lubricating plate and the tractor's fifth wheel. With this arrangement, the tractor's fifth wheel contacts the front bar prior to contacting the self-lubricating plate. Thus, the front bar prevents the tractor's fifth wheel from "grabbing" or peeling the leading edge of the self-lubricating plate from the outer surface of the housing.

The present invention may be retro-fitted to any existing semi-trailer or provided as an original equipment feature. Other features and advantages of the invention will be apparent from the following specification taken in conjunction with the following drawings.

BRIEF DESCRIPTION OF DRAWINGS

FIG. 3 is a partial cross-sectional view of a trailer plate of the present invention;

FIG. 4 is an exploded, partial cross-sectional view of a trailer plate of the present invention;

FIG. 5 is a view of a tractor fifth wheel incorporating the present invention;

FIG. 6 is a partial cross-sectional view of a trailer plate of the present invention;

FIG. 7 is an exploded, partial cross-section view of a trailer plate of the present invention;

DETAILED DESCRIPTION

Figure 1:
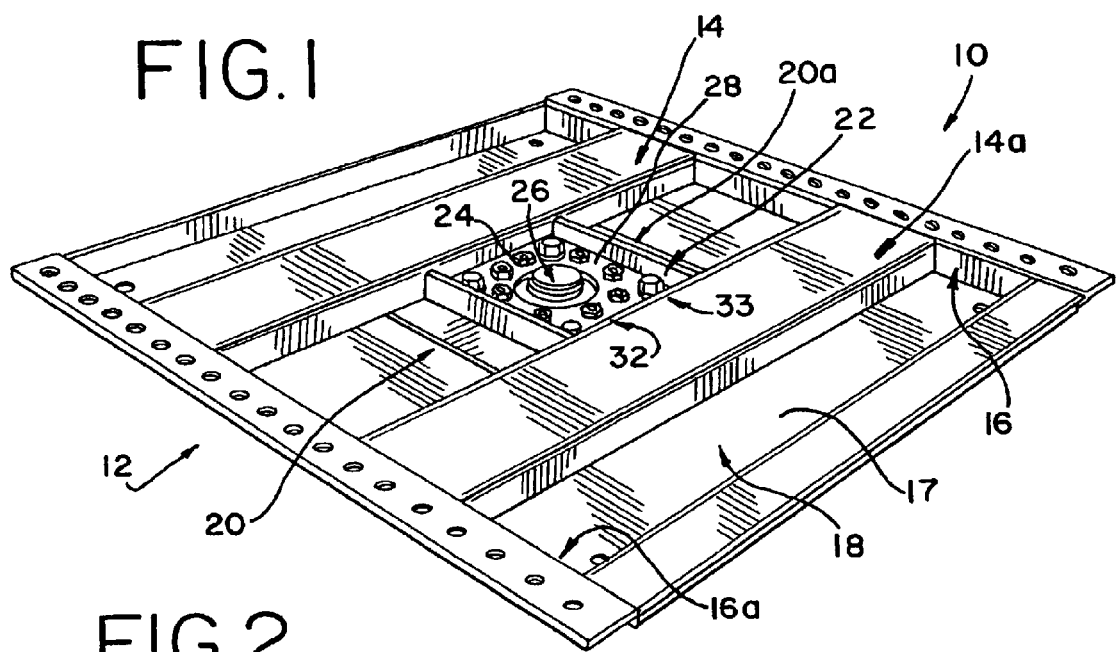
FIG. 1 is a perspective view of one version of a trailer plate assembly for coupling a truck tractor to a semi-trailer incorporating the present invention.
Figure 2:
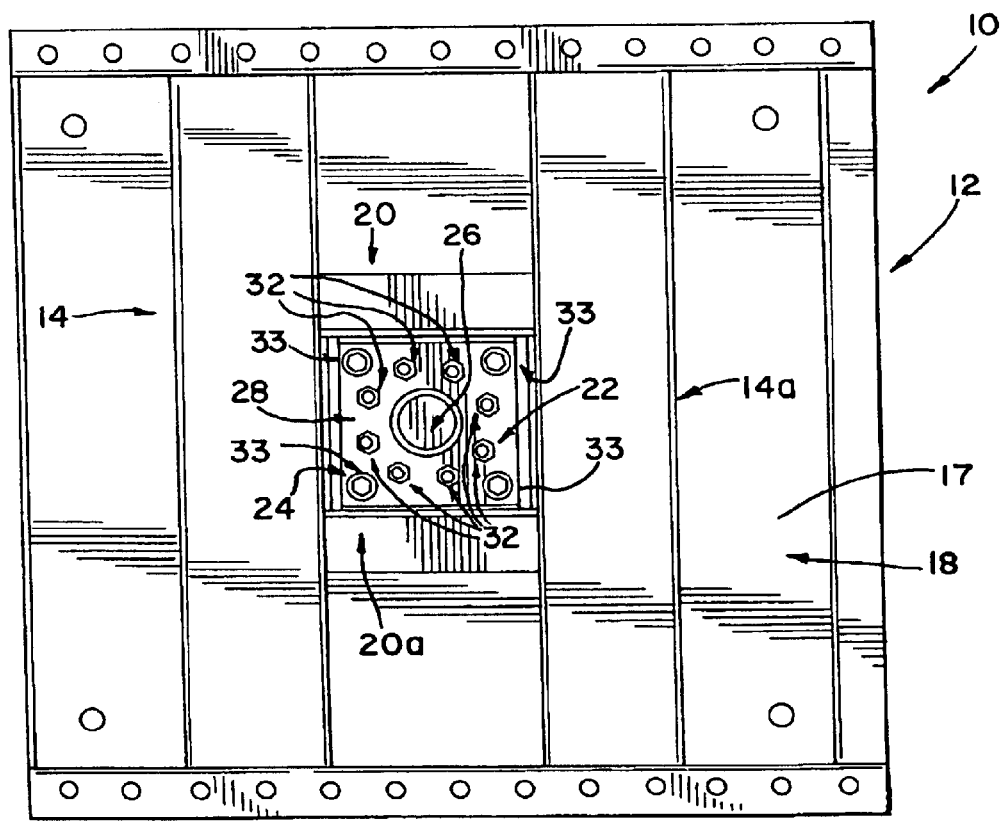
FIG. 2 is a top view of the trailer plate.
Figure 8:
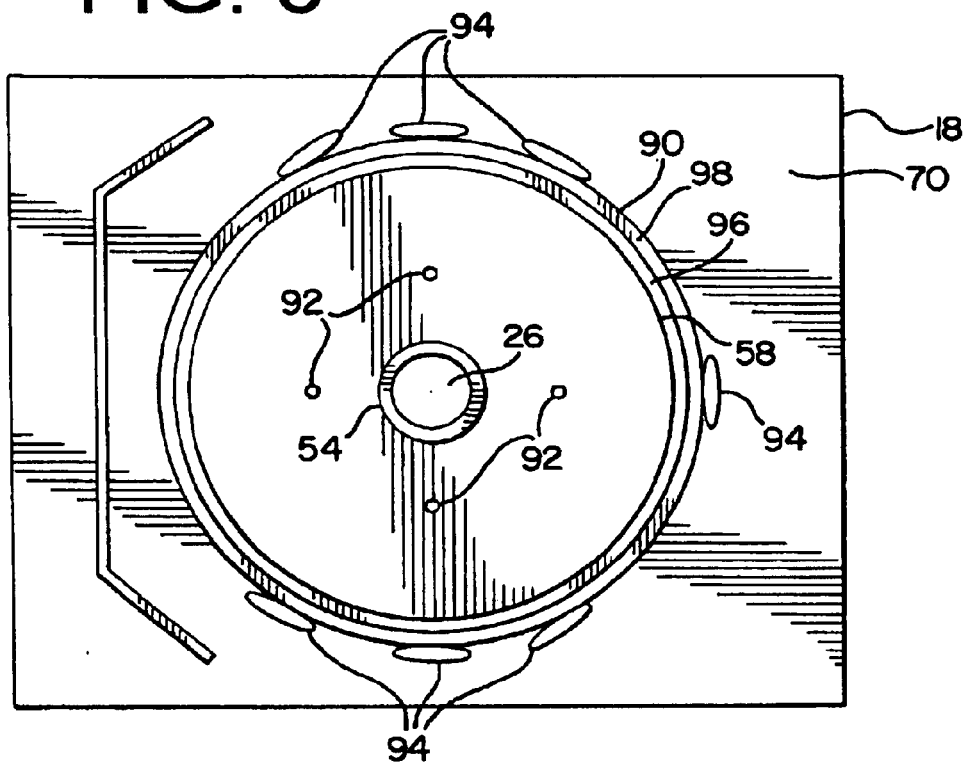
FIG. 8 is a bottom view of a trailer plate of the present invention.
Figure 9:
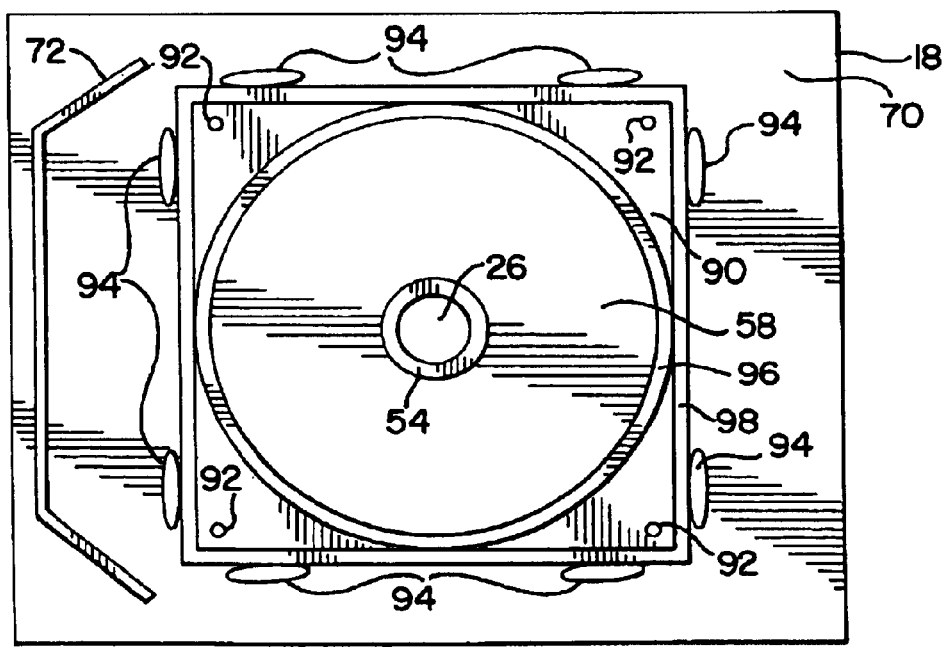
FIG. 9 is a bottom view of a trailer plate of the present invention.

While this invention is susceptible of embodiments in many different forms, there is shown in the drawings and will herein be described in detail, preferred embodiments of the invention with the understanding that the present disclosures are to be considered as exemplifications of the principles of the invention and are not intended to limit the broad aspects of the invention to the particular embodiments illustrated.

A trailer bearing plate assembly 10 is illustrated in FIG. 1. The trailer bearing plate assembly 10 includes a housing 12 adapted to be securely attached to an underside of a trailer. The trailer bearing plate assembly 10 can be attached by welding, bolting, or any other suitable attachment means. The trailer bearing plate assembly 10 further includes a plurality of spaced reinforcement beams 14, 14a. The reinforcement beams 14, 14a extend between a first pair of opposing end walls 16, 16a. Each reinforcement beam 14, 14a is attached at either end to the first pair of opposing end walls 16, 16a and an upper surface 17 of an upper coupling plate portion 18 of the housing 12.

A pair of spaced longitudinal supports 20, 20a extend between the reinforcement beams 14, 14a. The longitudinal supports 20, 20a are fixedly attached at their ends to the reinforcement beams 14, 14a and along their length to the upper coupling plate 18. In combination, the arrangement of the longitudinal supports 20, 20a and the reinforcement beams 14, 14a form a sub-housing 22 for receiving a double shear plane attachment means 24 for connecting a kingpin 26 to the housing 12.

Referring to FIGS. 3 and 4, the double shear attachment means 24 comprises a back plate 28, an intermediate, receiver or reinforcement plate 30, and a plurality of countersunk head bolts 32 and conventional bolts 33 working in combination with the upper coupling plate portion 18 of the housing 12 and the kingpin 26 to fixedly secure the kingpin 26 within the sub-housing 22. The double shear attachment means 24 is particularly effective in anchoring the kingpin 26 to the housing 12 under the large forces that the kingpin 26 experiences when the tractor is hauling very heavy loads. The double shear attachment means 24 also withstands the large forces associated with abrupt changes in direction. At the same time, the double shear attachment means 24 allows the kingpin 26, which is more susceptible to failure than other components of the housing 12, to be replaced with relative ease.

A conventional kingpin 26 with radial bolt holes 36 passes through an opening in the upper coupling plate 18. The kingpin 26 includes a flanged portion 34 positioned against the upper surface 17 of the upper coupling plate 18. The flanged portion 34 includes a plurality of radial bolt holes 36. The upper coupling plate 18 has an equal number of countersunk locking holes 38. When positioned correctly the radial bolt holes 36 of the flange 34 are aligned with the countersunk locking holes 38 in the upper coupling plate 18.

The reinforcement plate 30 is positioned within the sub-housing 22 in communication with the upper surface 17 of the upper coupling plate 18. The reinforcement plate 30 is fixedly attached to the upper surface 17 of the upper coupling plate 18 by welding or other suitable attachment means. The reinforcement plate 30 is generally produced from steel plate and includes a portal 40 for receiving the flanged portion 34 of the kingpin 26. The reinforcement plate 30 further includes a plurality of first threaded pin receivers 42 the purpose of which will become clear upon further description.

The back plate 28 is generally produce from steel plate and is positioned within the sub-housing 22 in communication with the reinforcement plate 30. The back plate 28 includes a large opening 44 for receiving a distal end 46 of the kingpin 26. The back plate 28 further includes a plurality of radial apertures 48. When positioned properly, the radial apertures 48 are aligned with the radial bolt holes 36 of the flange 34 and the countersunk locking holes 38 of the upper coupling plate 18. A set of countersunk head bolts 32 of sufficient length to pass through the countersunk locking holes 38 in the upper coupling plate 18, the radial bolt holes 36 in the flange 34, and radial apertures 48 of the back plate 28 along with a corresponding number of nuts 52 anchor the back plate 28 with the kingpin 26 and the upper coupling plate 18, thus creating a first shear plane.

The back plate 28 also includes a plurality of second threaded pin receivers 53. The second threaded pin receivers 53 are aligned with the first threaded pin receivers 42 of the reinforcement plate 30. A corresponding number of conventional threaded bolts 33 and washers 56 are provided. The threaded bolts 33 fixedly attach the back plate 28 to the reinforcement plate 30 but not with the flange 34 or coupling plate 18, thus creating a second shear plane.

The trailer bearing plate assembly 10 further comprises a self-lubricating plate 58 fixedly attached to the upper coupling plate 18. The self-lubricating plate 58 includes a perimeter surface 60 terminating with a chamfer 62. A contact surface 64 of the self-lubricating plate 58 has a precision surface finish on the order of about 250 microns. This facilitates the holding of a chemical attachment means 66 on an outer surface 70 of the upper coupling plate 18. The self-lubricating plate 58 is preferably formed from an ultra-high molecular weight polyethylene plastic such as Tivar®, produced by Menasha Corporation. A Tivar® disk or rectangular plate having a thickness of the order of 0.125" has been found to work satisfactorily. The self-lubricating plate 58 includes a centrally located hole 54 to permit the kingpin 26 to extend therethrough. The self-lubricating plate 58 is secured to the housing 12 by the chemical attachment means 66.

The chemical attachment means 66 is preferably a chemical adhesive such as Loctite® 401 or Loctite® 4471 or an adhesive tape such as Avery Dennison FasTape #8345 or FasTape #1191UHA. Prior to applying the chemical adhesive, the contact surface 64 of the self-lubricating plate 58 is primed with a commercially available primer such as Loctite® 401. Other treatments include corona discharge, flame edging, or acid bath. The chemical attachment means 66 is then applied to the contact surface 64 of the self-lubricating plate 58, and the self-lubricating plate 58 is chemically fixed to the outer surface 70 of the upper coupling plate 18.

Chemical attachment is preferable to mechanical attachment for a number of reasons. First, while mechanical fasteners are quick and easy to use, they create stresses in plastic which may lead to distortion or cracking. Second, mechanical fasteners create extra components which must be purchased and inventoried. Third, mechanical fasteners require altering the design of the self-lubricating plate 58 to include bosses and holes. Fourth, when the self-lubricating plate 58 experiences wear the mechanical fasteners could scrape and score the tractor's bearing surface. Finally, mechanical fasteners concentrate all of their holding power at the fastener location while chemical attachment can spread the load evenly over the entire joint area.

To further protect the self-lubricating plate 58 from premature peeling during coupling with a tractor's fifth wheel, a front bar 72 is mounted to the outer surface 70 of the upper coupling plate 18. The front bar 72 is generally produced from steel rod and is welded directly to the outer surface 70 of the upper coupling plate 18. The front bar 72 acts as a barrier between the self-lubricating plate 58 and the tractor's fifth wheel. With this arrangement, the tractor's fifth wheel contacts the front bar 72 prior to contacting the self-lubricating plate 58. Thus, the front bar 72 prevents the tractor's fifth wheel from "grabbing" or peeling the leading edge of the self-lubricating plate 58 from the outer surface 70 of the upper coupling plate 18.

As shown in FIG. 5, a self-lubricating plate 76 may be attached to the tractor fifth wheel 78. In this embodiment, the self-lubricating plate 76 is chemically attached to the tractor bearing plate 82 using either the chemical adhesive or the adhesive tape as previously described.

FIGS. 6–9 illustrate another embodiment of the present invention. In this embodiment, the self-lubricating plate 58 is bonded, as described above, to an attachment plate 90. The attachment plate 90 is then fixed to the outer surface 70 of the upper coupling plate 18 using bolts 92, welds 94 (see FIGS. 8 and 9), adhesives, rivets or the like. The attachment plate 90 is preferably fixed to the outer surface using welds 94.

In this embodiment, the self-lubricating plate 58 has a mitered peripheral edge 96. The mitered peripheral edge 96 of the self-lubricating plate is mated with a corresponding mitered peripheral edge 98 of the attachment plate 90. This arrangement provides a smoother surface for contacting a tractor fifth wheel to prevent damage, peeling, or premature removal of the self-lubricating plate 58. Alternatively, the peripheral edges 96, 98 can be rounded or altered to provide any shape which improves tractor/trailer coupling.

This embodiment is particularly useful for retrofitting existing trailers. Generally, the chemical fasteners used to fix the self-lubricating plate 58 to the attachment plate 90 or to the outer surface 70 of the upper coupling plate 18 require a very clean surface.

It is typically very difficult to prepare the outer surface 70 for the chemical fastener because the outer surface 70 may have warpage, damage, dirt, grease, and oil. Here, the self-lubricating plate 58 is fixed to the attachment plate 90 in a shop where the cleanliness of the attachment plate 90 can be tightly controlled. The attachment plate 90 or outer surface 70 is generally prepared using grit blasting, etching, cleaning, and priming. Increased bonding surface area and improved bonding result from treating the steel. Treating the self-lubricating plate 58 also improves the bond.

Thus, a wider variety of chemical fasteners and methods of using the chemical fasteners can be successfully utilized. For instance, two-part epoxy, cyanoacrylate adhesive, acrylic, urethane, structural film, and adhesive film can be utilized with pressure and heat to acquire a more secure bond between the attachment plate 90 and the self-lubricating plate 58. Pinch rolling, laminating, pressing and slow curing may also be provided to insure a more secure bond.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claim is:

1. An improvement to a replacement plate assembly for providing a low coefficient of friction surface between a truck tractor fifth wheel and a semi-trailer and attachable to an assembly for coupling a truck tractor to a semi-trailer comprising a housing having first and second pairs of parallel end walls spaced by an upper coupling plate, the upper coupling plate has an upper surface, an exposed outer surface, and an opening, a plurality of reinforcement beams extend between the first pair of parallel end walls, a portion of a kingpin extends through the opening in the upper coupling plate, the improvement comprising: an attachment plate having a bonding surface and an opposing surface, the attachment plate adapted for secure attachment to the exposed outer surface of the upper coupling plate wherein the opposing surface is adjacent the exposed outer surface of the upper coupling plate; and a self-lubricating plate of a first material securely joined to the bonding surface of the attachment plate wherein the attachment plate is located between the self-lubricating plate and the exposed outer surface of the upper coupling plate.

2. The improvement of claim 1 wherein the self-lubricating plate is securely joined to the bonding surface of the attachment plate by a chemical fastener.

3. The improvement of claim 2 wherein the bonding surface includes a treated surface for providing a clean surface for receiving the chemical fastener and the self-lubricating plate.

4. The improvement of claim 2 wherein the attachment plate is welded to the upper coupling plate.

5. The improvement of claim 2 wherein the attachment plate is mechanically fastened to the upper coupling plate.

6. The improvement claim 1 further comprising a barrier member located on the exposed outer surface of the upper coupling plate and between a leading edge of the upper coupling plate and the self-lubricating plate.

7. The improvement of claim 6 wherein the barrier member comprises a front bar fixedly attached to the upper coupling plate.

8. The improvement of claim 2 wherein the chemical fastener includes a bonding agent.

9. The improvement of claim 2 wherein the chemical fastener is a chemical adhesive.

10. The improvement of claim 2 wherein the self-lubricating plate is formed of a plastic.

11. The improvement of claim 10 wherein the plastic includes an ultra high molecular weight polyethylene.

* * * * *

UNITED STATES PATENT AND TRADEMARK OFFICE
CERTIFICATE OF CORRECTION

PATENT NO. : 6,773,023 B2
DATED : August 10, 2004
INVENTOR(S) : George C. Athans It is certified that error appears in the above-identified patent and that said Letters Patent is hereby corrected as shown below:

Column 6,
Line 49, insert -- of -- after the word "improvement".

Signed and Sealed this

Sixth Day of September, 2005

JON W. DUDAS
*Director of the United States Patent and Trademark Office*